(No Model.)

W. A. ROGERS.
TURNING LATHE.

No. 354,740. Patented Dec. 21, 1886.

Witnesses
J. J. Maloney
H. P. Bates

Inventor,
William A. Rogers,
by Jos. P. Livermore
Att'y

N. PETERS, Photo-Lithographer, Washington, D. C.

UNITED STATES PATENT OFFICE.

WILLIAM A. ROGERS, OF CAMBRIDGE, MASSACHUSETTS.

TURNING-LATHE.

SPECIFICATION forming part of Letters Patent No. 354,740, dated December 21, 1886.

Application filed January 25, 1886. Serial No. 189,683. (No model.)

*To all whom it may concern:*

Be it known that I, WILLIAM A. ROGERS, of Cambridge, county of Middlesex, State of Massachusetts, have invented an Improvement in Apparatus for Measuring the Work of Cutting-Tools in Lathes, Planers, and Similar Apparatus, of which the following description, in connection with the accompanying drawings, is a specification, like letters on the drawings representing like parts.

The object of my invention is to enable an operator to measure directly from the work or piece being operated upon in a lathe or planer or similar machine having a cutting or other tool for acting on the material, and feeding mechanism for moving the said tool, without resorting to the usual method of first ascertaining a dimension of the object by calipers or other similar instrument, and then ascertaining the amount of the said dimension by applying the said calipers to a standard of linear measurement. This latter method, which is commonly employed, involves the necessity, when the piece is to be cut down to a certain dimension, of stopping the operation before the said dimension is reached and measuring, then cutting again and measuring again, and thus gradually approximating the desired measurement, which cannot be reached at once on account of the danger of passing beyond and making a smaller dimension than it should be—an error that cannot be corrected.

The present invention consists, essentially, in employing one or more microscopes in connection with a standard of linear measure, there being, in the most general case, two microscopes employed having a fixed relation to one another—one located to observe the work or piece being operated upon, and the other being properly located to observe the graduations of a standard of linear measure—so that the part that is being acted upon by the tool is referred through the microscope to the standard of linear measure.

The invention further consists in various appliances for testing microscopically the accuracy of construction of different parts of the instrument or machine, the invention being shown as applied to a lathe, and having the special arrangements required for making the various measurements required in lathe-work.

Figure 1:
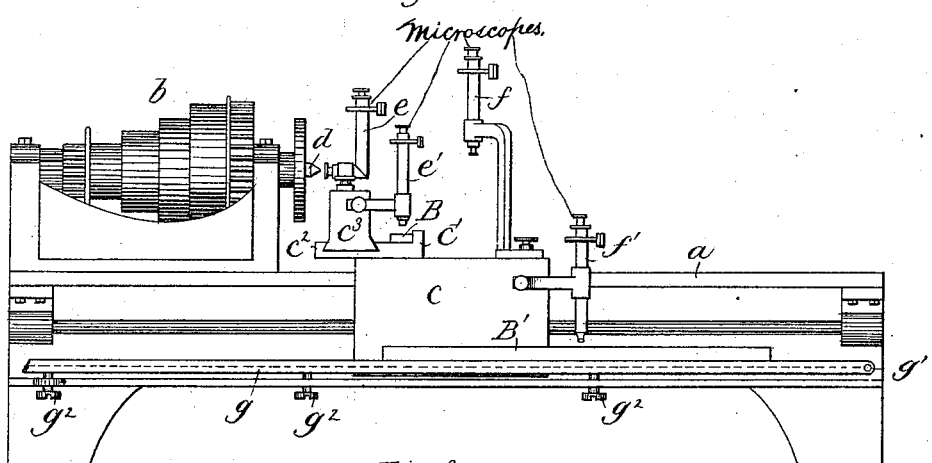
Figure 2:
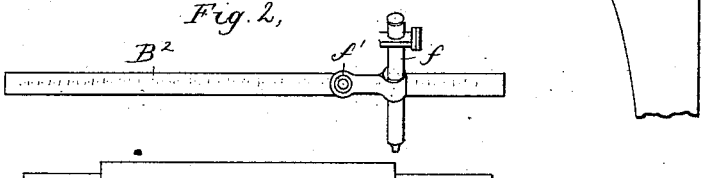
Figure 3:
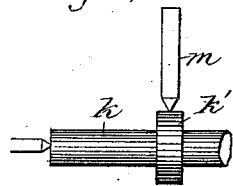
Figure 4:
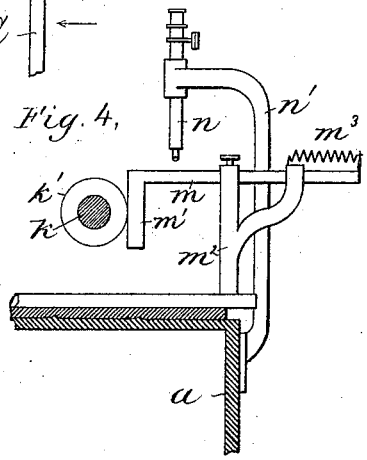

Figure 1 is a front elevation of a lathe provided with means for measuring directly dimensions of pieces being cut in the lathe, and especially the dimensions parallel with the axis of the lathe, and also for measuring radial dimensions of disks held while being cut only upon the main spindle in the head-stock of the lathe without the co-operation of the tail-center; Fig. 2, a diagram showing the arrangement of the microscopes and tool relative to the work in determining a dimension parallel with the axis of the lathe; Figs. 3 and 4, details in plan view and cross section of devices for determining the radial dimensions of pieces held between both centers of the lathe, and Fig. 5 a modification to be referred to.

The invention may be applied to a machine-tool—such as a lathe or planer—of any usual construction, having a tool-carriage and feed mechanism therefor, being shown in this instance as applied to a lathe, the bed $a$ and head-stock $b$ and tail-stock of which are of any suitable or usual construction, the latter not being shown in Fig. 1, as it is not necessary for the proper understanding of the invention, and does not of itself form any part of the invention. The tool-carriage $c$, having a longitudinal movement on the bed actuated by the usual feed mechanism, a portion only of which is shown in Fig. 1, is provided with a platform, $c'$, having a transverse way, $c^2$, for the post or upright $c^3$, which may carry a cutting-tool, and has a sliding movement transverse to the bed of the lathe, or radial to the piece that is being turned in the lathe.

In order to test the accuracy of the head-center $d$ of the lathe, a bent microscope, $e$, is employed, having the point of the center $d$ in its field of vision, and if, when the said center is rotated in the usual manner, the said point appears stationary in the field of the microscope, it will show that it is accurately centered, but if it is not accurately centered it will apparently describe a small circle in the field of the microscope, the radius of which measured by the usual micrometer eye-piece will show the amount of eccentricity of the center. The bent microscope $e$ may also be employed in measuring the operation of turning a disk or piece carried by the head-stock of the lathe without co-operation with the tail-stock, being used for this purpose in conjunction with another microscope, $e'$, carried by the same upright $c^3$, or otherwise held in fixed relation to the one $e$, and consequently having its movement transverse to the lathe-bed equal to that of the said microscope $e$ and of the tool, if it is carried by the same upright $c^3$. The said microscope $e'$ is arranged to observe a line-measure bar, B, supported in any suitable way on the tool-carriage $c$, so as to have no movement transverse to the bed of the lathe.

In using these appliances for measuring the radius or diameter of a disk at any point where the tool is operating, the center of the said disk is first found by bringing the microscope $e$ over the point of the said disk, which appears stationary in its rotation, and the position of the microscope $e'$ is then observed with relation to the bar B, the point or graduation of the bar coinciding with the axis of the microscope forming an O-point, from which the measurements of radius are taken. Preferably the upright $c^3$ will be a different one from that supporting the tool, and moved to the opposite side of the disk that is being cut to the side where the tool is acting; and when, for instance, the disk is to be cut inward from its outer edge to a circle of a certain radius, the two connected microscopes $e$ $e'$ will be moved the distance equal to the said radius by measuring the movement by means of the microscope $e'$ and bar B. The circle to which it is to be cut will be in the field of the microscope $e$, and by watching the face of the disk through the said microscope as the tool is fed forward the feed can be stopped the instant the cut edge comes into the field of the microscope $e$. As owing to the feed of the tool the cut is spiral, the radius will be greater on the side observed by the microscope than at the point where the tool cuts by half the feed for each turn of the disk, and consequently the feed should be stopped before the line of cut observed by the microscope $e$ arrives at the desired division in the graduated field of the said microscope, and the work may be turned without feed, so as to leave the cut circular, the advance of the cut in the next revolution being observed with relation to the graduated field of the microscope $e$, which will then determine whether the cut is accurately circular or not, and may be also used to measure the slight additional feed which may be necessary to bring the cut in the disk to exactly the desired diameter and also to true the circle.

If it is necessary to have the microscope $e$ and the tool on the same post, and consequently on the same side of the center, the tool can be set to cut just below the horizontal line passing through the center. Then by observing the standard B by the microscope $e'$ as it travels along with the tool the latter may be fed in the proper direction until the edge cut by it on the disk is at just the desired distance from the center, or, in other words, the part cut is of exactly the correct diameter, and by observing the material being cut from time to time by the microscope $e$ the wear of the tool in the cutting operation does not affect the measurement, as the line of cut is itself referred by the two microscopes to the standard-bar B, and if the edge of the tool has varied from wear or otherwise it will usually not be by a distance greater than can be measured by the graduated field of the microscope $e$, so that the amount of additional feed required to make up for the change of position of the tool may be determined and measured without readjustment of any of the parts. When, however, the wear of the tool in a single cutting operation is so small as to be immaterial, the microscope $e$ may be dispensed with, and the measurement made by the microscope $e'$ in connection with the bar B, in the same manner as before described, the cutting-edge of the tool being first placed exactly in the axis of the lathe, and the corresponding zero-point observed on the bar B, after which any distance traversed by the microscope $e'$ on the bar B will represent the distance of the cutting-edge of the tool from the center of the lathe, or, in other words, the exact radius at the point where the cutting-tool is at each moment acting, provided that the cutting-edge has not worn away or changed its position with relation to the tool-post during the cutting operation.

For determining dimensions parallel with the axis of the lathe, the tool-carriage $c$ may be provided with a work-observing microscope, $f$, so placed with relation to the tool that it may observe the edge left by the tool on the material being turned, and with a co-operating measuring-microscope, $f'$, placed to observe a standard of linear measure, B', which may be placed on a suitable supporting-platform, $g$, at any desired position with relation to the lathe-bed, the said platform being shown as pivotally supported at one end, as $g'$, and sustained at various points throughout its length on adjustable supports $g^2$, by which it may be brought into exact parallelism with the plane of the ways of the tool-carriage $c$, the said supports being sufficiently near together to remove any material horizontal flexure. These microscopes may be used for measuring the distance at which the edge of the tool is acting from any other desired point on the shaft or piece being turned, for the purpose, for instance, of producing a collar or flange of a definite width, or for cutting off a shaft of a certain definite length, by first placing the microscope $f$ over the point from which the dimension is to be measured and observing the position of the microscope $f'$ with relation to the bar B' for the zero-point of the said dimension, and the cutting-tool being so set that the place cut will be in the field of vision of the microscope $f$, although the position of the cut may be changed slightly in the said field, if the position of the edge of the tool with relation to the carriage $c$ varies from wear or other cause, and in order to compensate for such change in position of the edge of the tool the observations are taken from corresponding lines in the graduated field of the microscopes $f f'$. For instance, the zero-line in the field of the microscope $f$ is placed on the starting-point on the work, and the observation of the bar B' is made with relation to the zero-line of the microscope $f'$. Then the tool-carriage is moved to about the point where the cutting is to be made, the distance being measured by the microscope $f'$ on the bar B', and then while the tool is in operation the edge cut by it is observed by the microscope $f$, and the exact position of the said edge with relation to the starting-point is known by the observation of the bar B' by the microscope $f'$.

If it is found that the position of the cut edge varies from the zero-line of the microscope $f$, the observation of the bar B' will have to be taken from a corresponding position in the field of the microscope $f'$; but as such variations will be only slight, and may not occur at all, it will not be necessary to use the microscope $f$, except merely to determine if such change of position of the tool has taken place, and in the operation of feeding the tool up to a certain point it will be necessary merely to watch the movement of the microscope $f'$ over the bar B' until the desired point is nearly reached, when another observation may be made through the microscope $f$ to see if it is necessary to make any change in the point in the field of the microscope $f'$ that is to be referred to the standard B'.

Owing to the feed of the tool its cut will be helical, and there will consequently be a slight difference in position with relation to the axis of the lathe of the edge of the tool and the edge of the cut where observed by the microscope, and the feed of the tool will have to be stopped in time to allow for this, after which, by turning the material without feeding the tool, the line of cut will be brought into a plane at right angles to the axis, and its position may be accurately determined by the microscope $f$, and any further cut which may be needed may be readily made. The microscope also shows whether or not the cut is finally exactly in the plane at right angles to the axis of the lathe.

Fig. 2 represents a slightly-different method of making the same kind of measurement that was last described. A represents the piece that is being turned on which it is desired to make a shoulder, 2, at a certain exact distance from the shoulder 3 by feeding the tool C in the direction of the arrow until it arrives at the desired distance from the shoulder 3. In this arrangement the microscopes $f f'$ are not mounted on the tool-carriage, but are placed on another carriage, or so aranged that they can be placed in different positions along the bed of the lathe, but always in the same position with relation to the axis thereof. They are first placed with the microscope $f$ over the edge 3, and an observation made of the bar $B^2$ by the microscope $f'$ to give a zero-point from which to take the measurement, and are then moved to another position, which is shown by the microscope $f'$ in connection with the bar $B^2$, to be the distance from the said zero-point that the shoulder 2 is to be from the shoulder 3. Then the microscopes remain stationary while the tool is fed, and by observing the surface of the work through the microscope $f$ the feeding operation can be stopped when the edge 2 comes into the field of the microscope, and then brought to exactly the desired position in the field by suitable slow movement of the tool C. It will be seen that by this method the tool may be fed without danger up to the exact point at which it is to be stopped, and the loss of time necessitated by stopping the tool, measuring, and advancing again, as before practiced, is wholly obviated, besides insuring far greater accuracy of dimensions than can be attained by the old method of first calipering the object and then measuring the space spanned by the calipers, both of which operations are necessarily imperfect, and both liable to error.

For making radial measurements of a piece supported between both centers provision has to be made for determining the distance of the microscope from the axis of the lathe, as it cannot be placed there, as the piece to be turned will be in the way.

In order to determine the distance of the microscope from the axis of the lathe to afford a starting-point for radial measurement, the devices shown in Figs. 3 and 4 may be employed, consisting of what may be termed a "diameter-standard," composed of a cylinder, $k$, carefully turned to uniform diameter throughout, and having a collar, $k'$, which may be slid thereon to any desired position between the centers, and is carefully turned to a definite known diameter. Then a gage, $m$, having an arm, $m'$, that will bear against the surface of the diameter-gage $k'$, or against the surface of the piece being cut, is brought into contact with the said diameter-gage $k'$, the said gage $m$ being supported in a suitable upright, $m^2$, which may be supported either on the lathe-bed or on the tool-carriage. The upper surface of the gage $m$ is either graduated for linear measurement or has supported on and movable with it a graduated bar with the graduations in position to be observed by a microscope, $n$, preferably supported on an upright, $n'$, attached to the lathe-bed $a$, or otherwise held so as to have no transverse movement with relation to the lathe-bed. As the diameter of the ring $k'$ is known, the observation of the microscope on the graduated surface of the gage $m$ forms a starting-point for radial measurements, and when the said starting-point is determined the gage $m$ may be moved back from the diameter-standard $k'$, which, with its supporting-cylinder $k$, is removed from the lathe and the work to be turned properly centered. Then the gage $m$ is moved up into contact with the work, and the new reading of the microscope $n$ thereon will show the difference in diameter between the work and the ring $k'$, from which the actual diameter of the work may be determined, and in turning the work down to the desired diameter the gage $m$ may be kept in contact with the surface at each moment left by the cutting-tool by means of a spring, $m^3$, which moves the said gage in the guide-bearings of its supporting-bracket $m^2$, holding the finger $m'$ against the work, and the movement of the gage beneath the microscope $n$ shows the progress of the cutting operation, which may be stopped when the required diameter is reached, as shown by the reading of the microscope $n$ on the linear standard carried by the gage $m$.

Figure 5:
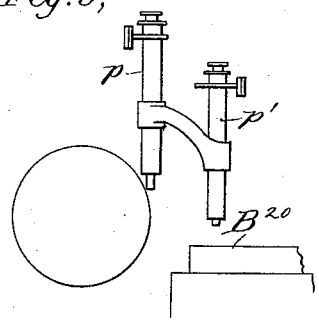

Instead of a starting-microscrope and movable gage, as shown in Fig. 3, for making radial measurements, two microscopes, $p\,p'$, and a stationary gage might be employed, as shown in Fig. 5, one microscope being set to observe the changing surface of the cylinder, and the other to observe the standard $B^{70}$, the operation corresponding with that previously described for making measurements parallel with the axis of the lathe.

In Letters Patent No. 301,165, dated July 1, 1884, a screw-cutting lathe was shown having a single microscope movable with the tool-carriage co-operating with a stationary line-measure standard, and I do not herein broadly claim a tool-carriage provided with a microscope co-operating with a line-measure bar; but the said patented apparatus does not have the co-operating work-observing microscope, and consequently would afford no indication of a change in position of the cutting-edge of the tool, but depends for its accuracy upon the permanency of the relation between the position of the cutting-edge of the tool and the axis of the microscope.

I claim—

1. The combination, with a machine or tool, of a work-observing microscope held in position to observe the part of the material acted upon by the tool, and a measuring-microscope held in fixed relation to the work-observing microscope, and a standard of linear measure in position to be observed by the said measuring-microscope, substantially as described.

2. The herein described means for determining the existence and amount of eccentricity of a rotating lathe center or pivot, consisting of a microscope and means to support the same, with its field encompassing the said center, substantially as described.

3. The combination, with a lathe and upright having a movement transverse to the axis of the lathe, of two microscopes supported in fixed relation to one other on said upright, the one having its axis of vision parallel with the axis of the lathe, and arranged to observe the face of a piece carried by the head-stock only of the lathe, and the other having its axis of vision at right angles to the axis of the lathe, and a standard of linear measure transverse to the axis of the lathe co-operating with the latter microscope, substantially as described.

4. The combination, with a lathe, of a gage arranged to engage the convex surface of the piece being turned, and provided with a standard of linear measure, and a stationary microscope co-operating therewith for measuring the radius of the part of work being turned, substantially as and for the purpose described.

5. The combination, with a lathe, of the diameter-standard consisting of a cylinder of known diameter, with the sliding gage having a finger arranged to engage the curved surface of the said standard, or of the piece carried by the lathe, and carrying graduations of linear measurement, and the stationary microscope in position to observe said graduations, substantially as described.

In testimony whereof I have signed my name to this specification in the presence of two subscribing witnesses.

WILLIAM A. ROGERS.

Witnesses:
 Jos. P. LIVERMORE,
 H. P. BATES.